United States Patent [19]

Grace

[11] Patent Number: 4,830,491

[45] Date of Patent: May 16, 1989

[54] CAVITY SCOPE

[75] Inventor: Garland K. Grace, Huntsville, Ala.

[73] Assignee: Morton Thiokol, Inc., Chicago, Ill.

[21] Appl. No.: 601,533

[22] Filed: Apr. 18, 1984

[51] Int. Cl.⁴ .............................................. G02B 23/24

[52] U.S. Cl. ........................................ 356/241; 354/63

[58] Field of Search ................. 356/241; 354/63, 79; 86/1 R; 358/100

[56] References Cited

U.S. PATENT DOCUMENTS

| | | | |
|---|---|---|---|
| 3,329,059 | 7/1967 | McCormac | 356/241 |
| 3,382,757 | 5/1968 | Poirrier | 356/241 |
| 3,852,527 | 12/1974 | McQuivey | 356/241 X |
| 3,862,359 | 1/1975 | McCullough et al. | 356/241 X |
| 3,917,432 | 11/1975 | Feverstein et al. | 356/241 X |
| 4,536,827 | 8/1985 | Berthold, III et al. | 362/32 |

Primary Examiner—Vincent P. McGraw
Attorney, Agent, or Firm—Gerald K. White

[57] ABSTRACT

A portable, self-contained, light-weight, compact and explosion-proof device, that is readily dismantable and transportable by automobile or aircraft, for inspecting the ignition surfaces of a solid propellant rocket motor can be introduced into the motor from the aft end thereof with or without the nozzle in place and is characterized in that a light source, reflecting means and viewing means are so arranged therein as to allow an operator to observe from outside the motor the condition of the entire ignition surface from either the aft end or the head end of the motor.

19 Claims, 11 Drawing Sheets

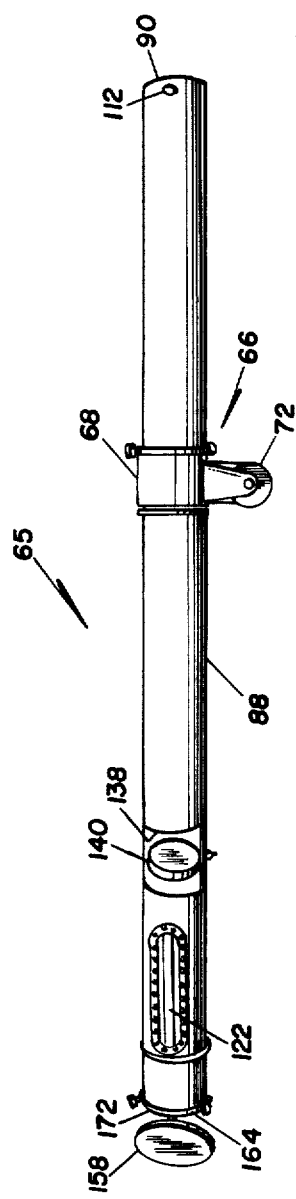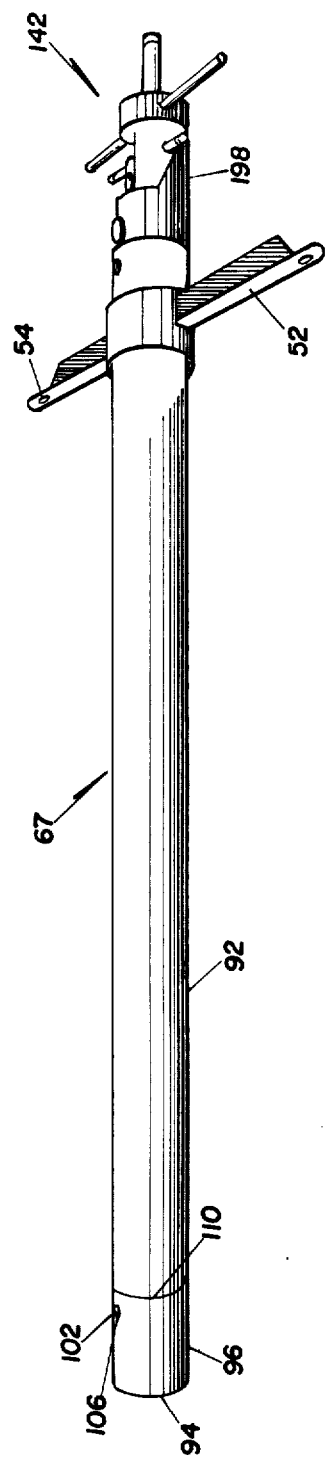
Fig. 7
Fig. 8

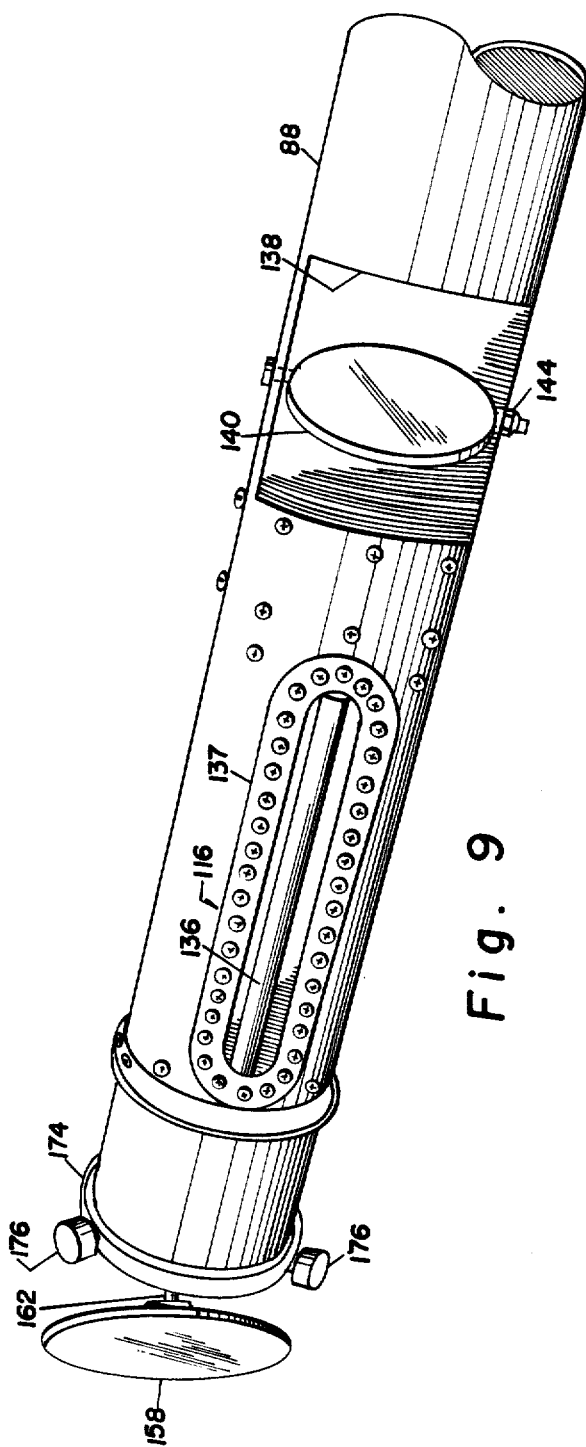
Fig. 9
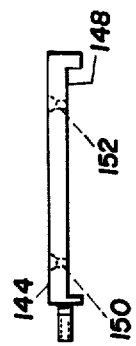
Fig. 11
Fig. 12
Fig. 13

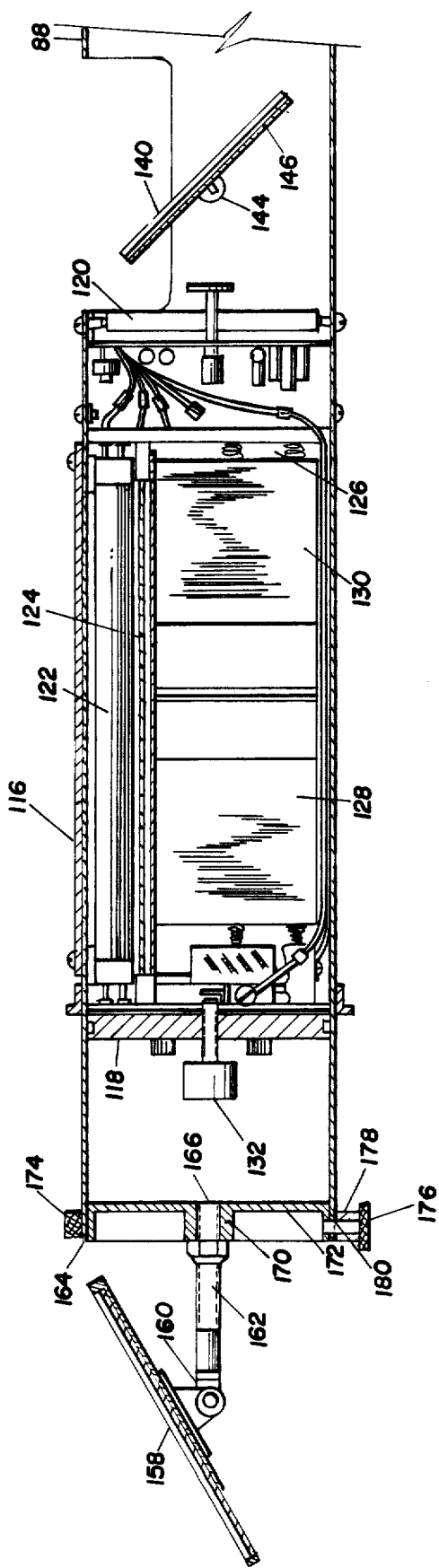
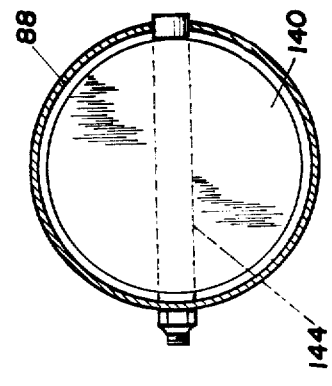
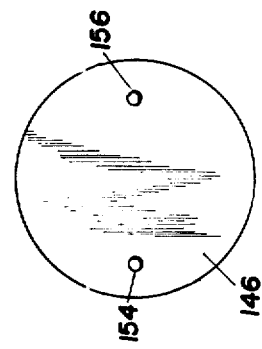

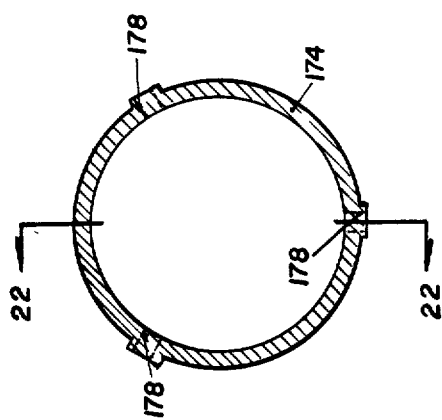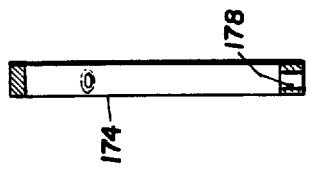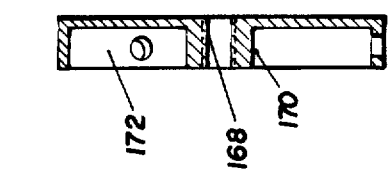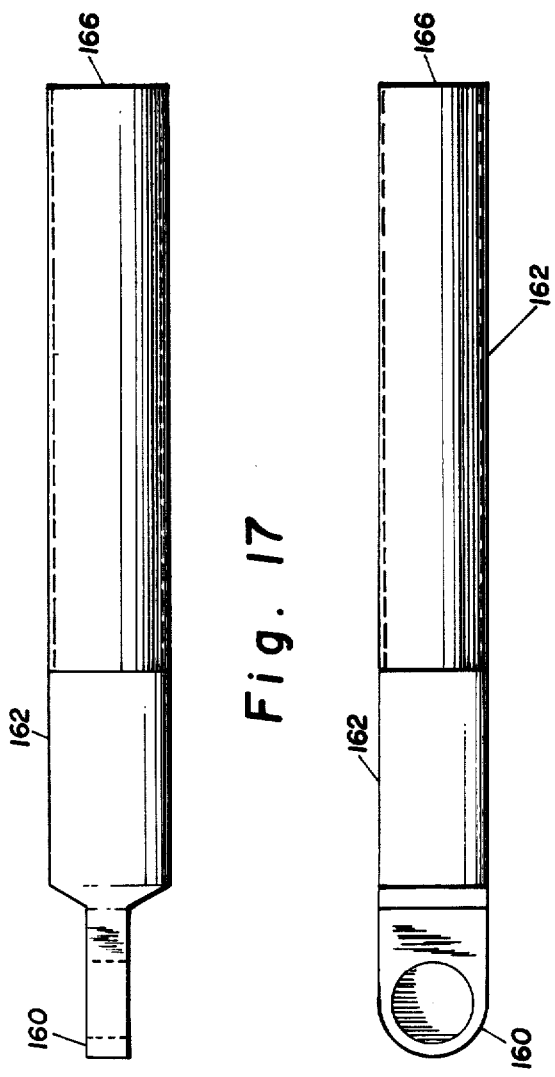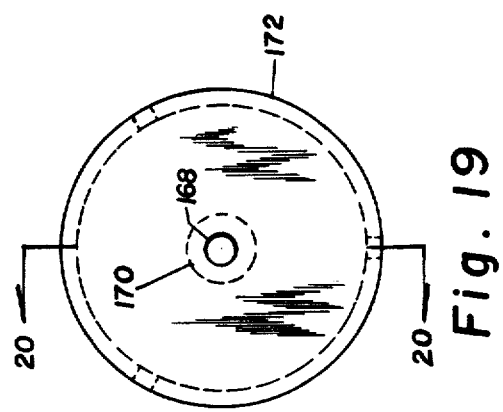

CAVITY SCOPE

BACKGROUND OF THE INVENTION

1. Field of the Invention

The present invention relates to inspecting devices, and more particularly, to a readily transportable, detachable device that is adapted for viewing and photographing the cavities or interiors of elongated hollow articles such as rocket motors and the like.

2. Description of the Prior Art

In solid propellant rocket motors, the charge of propellant is cast in the rocket motor casing and cured. Typically, the propellant is cast with the internal surface of the hollow bore or cavity having a predetermined configuration, such as that of a star, with alternating star valleys and star points.

The interior surface of a rocket motor solid propellant charge is designed to produce the quantity of gas required for creating the desired operating pressure of the motor. Surface irregularities or defects such as cracks, lumps, etc. in the interior surface of the cavity of the propellant increase the burning area. This causes an undesirable increase in the internal pressure that could result in the destruction of the motor.

Accordingly, after the charge of propellant has been cast and cured, and before the motor is stored, it is very desirable and important to inspect the interior for defects. Additionally, since aging may adversely affect the interior surface of the propellant charge, periodic inspection thereof during storage of the rocket motor also is important.

Devices for inspecting the interior surface of a rocket motor cast propellant charge have been proposed in the prior art. Typical of such proposals are the disclosures of U.S. Pat. Nos. 3,329,059, granted on July 4, 1967 to J. McCormac, and of 3,382,757 granted on May 4, 1968 to J. A. Poirrier. Both of these patents are assigned to Thiokol Corporation, the assignee of the present invention.

The inspecting device of U.S. Pat. No. 3,329,059 includes a long thin-walled, relatively large diameter tubular housing that extends for substantially the entire length of the propellant body, coincident with the central axis of the rocket motor. At the viewing end thereof, the tubular housing is supported by an adapter that is connected to the igniter opening at the head end of the rocket motor. At the other end, the tubular housing is supported by a plurality of spring loaded pivotable support arms that pivot radially outwardly to engage star points on the interior surface of the propellant. Bearing means provided at each end of the tubular housing allow the latter to be rotated through 360° with respect to the support arms.

A longitudinal slot extends along one side of the housing for substantially the entire length. Two longitudinally spaced and independently adjustable rectangular reflectors that are actuable longitudinally of the propellant bore by a sprocket and tape system are arranged to reflect light through the slot to the interior surface of the propellant from a housed light source that is provided exteriorly of the motor, at the viewing end of the tubular housing. The reflectors are both angularly adjustable relatively to the axis of the tubular housing, the reflector closer to the light source being narrower than the other one so as not to obstruct all of the light to the latter. The viewing means comprises a telescope that extends into the end of the tubular housing at the outside of the motor.

In operation, the inspecting device is inserted into the propellant cavity through the igniter opening in the head end of the rocket motor. As inserted, the plurality of support arms are pivoted so that they lie parallel to the central axis of the tubular housing. Upon insertion into the hollow bore of the cast propellant, the support arms pivot radially outward by spring action to effect contact of rollers on the ends thereof with propellant star points thereby to align the tubular housing with the central axis of the latter.

In another embodiment disclosed in U.S. Pat. No. 3,329,059, the tubular housing is greatly reduced in length, and supports only the light source and the telescope. The need for rotating the housing is eliminated, and the angles of the reflectors are not adjustable relatively to the axis of the inspecting device. A long frame, centered on the central axis of the cast propellant and extending the length of the cavity, is supported in a manner similar to that of the first described embodiment. The frame supports two longitudinally spaced and relatively movable conical reflectors, the reflectors being adapted for sliding longitudinal movement along the frame relative to each other and to the observer at the telescope. A pulley system is provided for sliding the conical reflectors longitudinally of the bore of the cast propellant.

The inspecting device of U.S. Pat. No. 3,382,757 includes a wheeled carriage for traversing the hollow bore or cavity to be inspected. The wheels of the carriage are biased to ride in star valleys at opposite sides of the propellant, thus suspending the carriage between them. A sectional control rod is provided for moving the carriage. The control rod is extensible exteriorly of the rocket motor, from the head end thereof, and is rotatable for adjusting a transmission housing on the carriage. A cantilevered beam, extending from the transmission housing and positioned adjacent the control rod, supports internally of the bore under inspection two appropriately positioned light sources and an angled mirror. The mirror is attached to the end of the beam facing the head end of the motor. A telescope, separately mounted on the motor at the head end thereof, is sighted on the mirror and provides a view of a portion of the interior surface of the propellant by means of longitudinal and rotational adjustment of the control rod from outside the motor.

Such prior art inspection systems are characterized by a number of inherent disadvantages. They are overly complicated, involve many parts, are bulky and cumbersome, and do not lend themselves to being transported readily by automobile or aircraft. Additionally, since the supporting means for the inspection devices, internally of the motor, are positioned further from the viewing means than the reflectors, such inspection devices do not readily allow an inspection of the entire propellant cavity surface. Thus, there exists a need and a demand in the art for further improvements in devices for the inspection of the interior of solid propellant rocket motors or similar articles.

SUMMARY OF THE INVENTION

An object of the invention is to provide a detachable cavity inspecting device that is capable of providing a ready inspection of the entire cavity from the outside.

Another object of the invention is to provide such an inspecting device that enables the condition of the entire interior surface of the cast solid propellant of a rocket motor to be readily visually observed from outside the motor.

A further object of the invention is to provide such an inspecting device including a light source for illuminating the interior of a solid propellant rocket motor and mirrors that are positioned for viewing the interior of the motor, from either end thereof.

Still another object of the invention is to provide a portable, self-contained, light weight, compact, explosion proof bore inspecting device that is capable of being introduced in the igniter opening at the head end of a rocket motor or in the aft end of the motor with or without the nozzle in place.

In accomplishing these and other objectives of the invention, there is provided an inspecting device including a thin walled sectional tubing or tubular housing for inspecting the interior of a solid propellant rocket motor, or similar article having a casing disposed symmetrically with respect to a longitudinal axis, which device can be introduced into the head or front end of the motor or from the aft end of the motor with or without the nozzle in place. That portion of the inspecting device extending outside the motor, when introduced from the head end, is supported by a sleeve bearing that is installed in the motor ignition opening. When introduced into the aft end of the motor, the portion of the inspecting device extending outside the motor is supported either by a sleeve bearing supported by the motor case or by the exit portion of the motor nozzle. In each case the portion of the inspecting device inside the motor is supported by a roller assembly that bears on the surface of the internal configuration of the motor.

Provided within the sectional housing, adjacent the forward end thereof, is a light source for illuminating the propellant cavity and mirrors that are positioned for viewing the cavity from either end of the motor. The enclosure for the light source is explosion proof and self-contained. It can be positioned along the motor cavity by adding extension tubes, if necessary, and sliding the tubes through sleeve bearings. The light source and the mirror can also be rotated through 360° around the longitudinal axis of the motor within the sleeve bearing supports.

A jig transit mounted exteriorly of the motor, in a transit tube, provides a view of the image reflected in the mirrors. The jig transit may be so mounted at either the head end or aft end of the motor thereby to facilitate an inspection of the entire cavity surface. It is contemplated that various optical devices or cameras can be employed to photographically record the images reflected in the mirrors.

BRIEF DESCRIPTION OF THE DRAWINGS

Having summarized the invention, a detailed description follows with reference being made to the accompanying drawings which form part of the specification, of which:

FIG. 7 is a perspective view of a first portion of the inspecting device showing the construction thereof for illuminating and enabling visual observation of the interior surface of the propellant;

FIG. 8 is a perspective view of a second portion of the inspecting device showing the construction for the attachment thereof to the aft end of the rocket motor and the means for visually observing the surface of the propellant;

FIG. 9 is an enlarged perspective view of a portion of the exterior of the first portion of the inspection device for illuminating the interior surface of the propellant and for enabling visual observation thereof;

FIG. 10 is an enlarged cross sectional view of that part of the inspecting device shown in perspective in FIG. 9;

FIGS. 11, 12 and 13 are plan, side and end views, respectively, of a shaft that is provided for supporting an aft mirror of the inspecting device;

FIGS. 14 and 15 are plan and side views of a mirror support disc that is provided for supporting the aft mirror;

FIG. 16 shows an assembly of the aft mirror on the supporting shaft therefor within the first portion of the inspecting device;

FIGS. 17 and 18 are plan and side views, respectively, of a mirror bolt that is provided for supporting a forward mirror of the inspecting device;

FIG. 19 is a plan view of a mirror support disc that is provided for the forward mirror;

FIG. 20 is a cross sectional view of the forward mirror support disc taken along the lines 20-20 of FIG. 19;

FIG. 21 is a plan view of a retaining ring for the forward mirror support disc;

FIG. 22 is a cross sectional view taken along the lines 22—22 of FIG. 21;

DESCRIPTION OF THE PREFERRED EMBODIMENT

Figure 1:
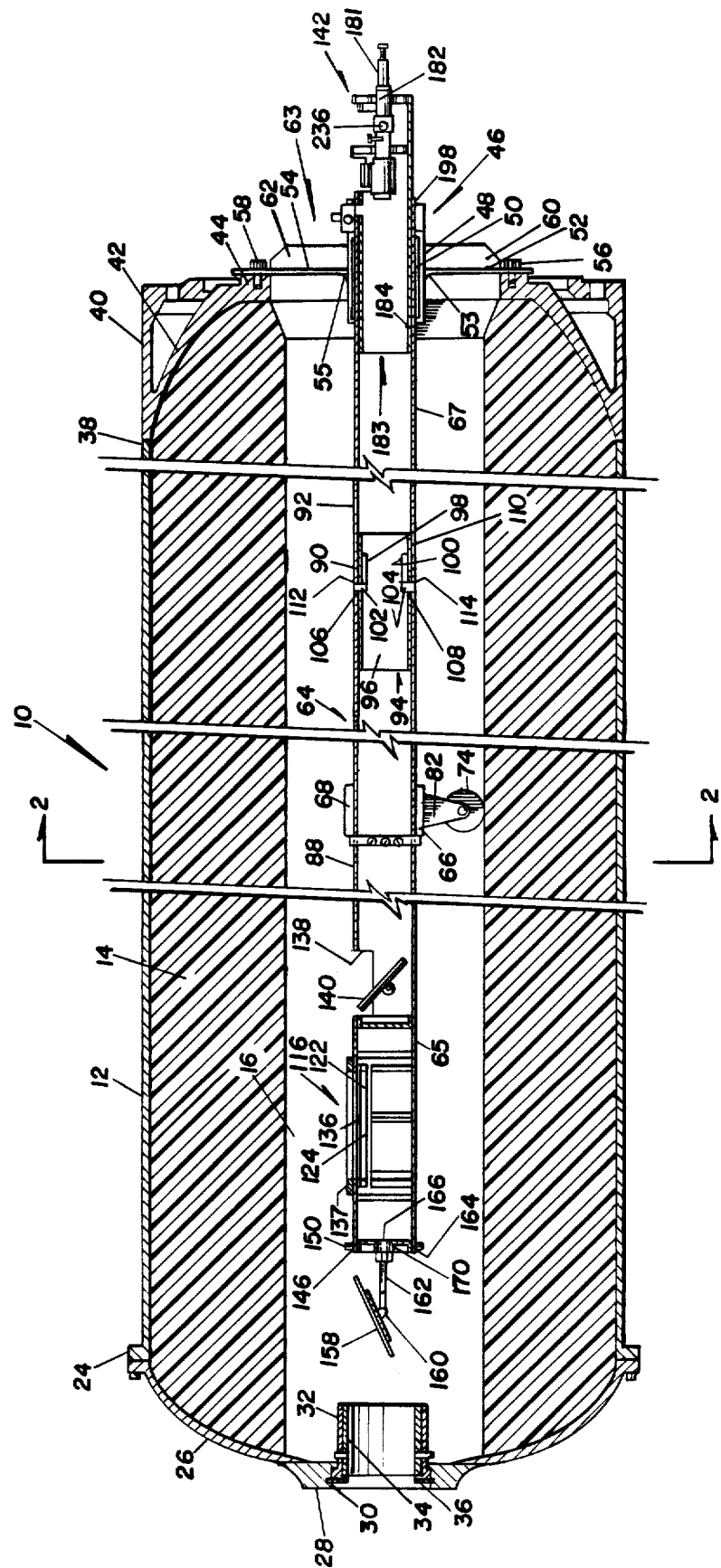
FIG. 1 is a fragmented sectional view of a solid propellant rocket motor in side elevation showing a cavity inspecting device embodying the invention mounted in the aft end of the motor.
Figure 2:
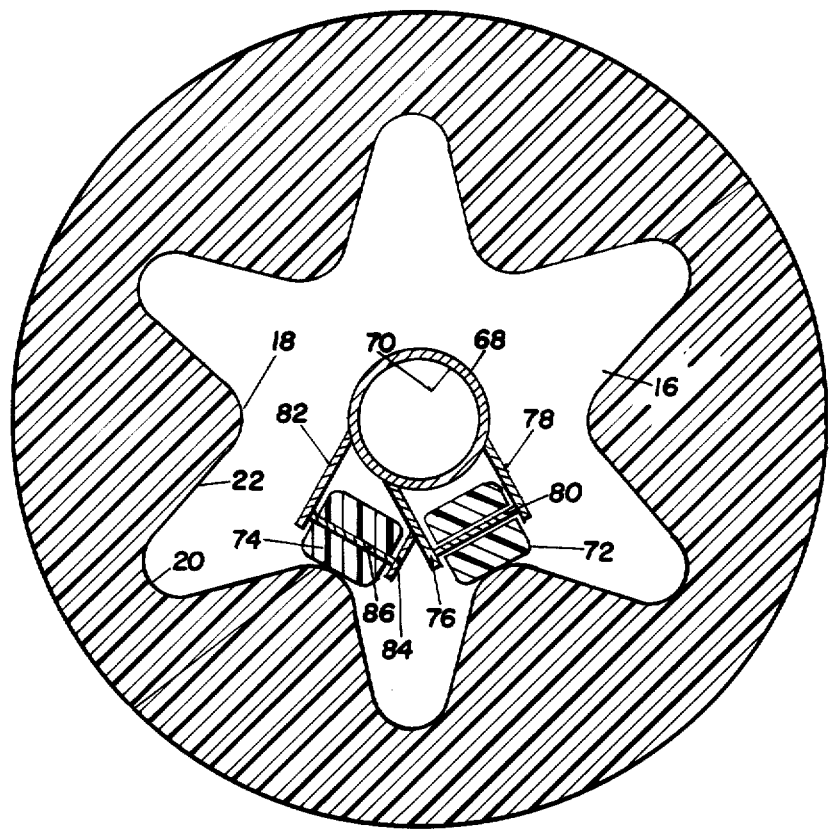
FIG. 2 is a transverse sectional view taken on the line 2—2 of FIG. 1 to illustrate the configuration of the surface of the propellant to be inspected and the manner of supporting the inspecting device interiorly of the rocket motor.

Referring to the drawings, there is illustrated in FIG. 1 a rocket motor 10 comprising a casing 12 having a solid propellant charge 14 bonded thereto. Propellant charge 14 has an axial bore or cavity 16 therein that extends along the longitudinal axis of motor 10. The central axis of the cavity 16 is arranged to coincide with the longitudinal axis of the rocket motor 10. The cross section configuration of the cavity 16, as shown in FIG. 2, is that of a star having alternate star points 18 and star valleys 20. The entire ignition surface of the propellant charge is designated by the numeral 22.

At the head or forward end, designated 24, of motor 10, as seen in FIG. 1, there is provided a forward dome 26 and an ignition attachment boss 28. Boss 28 has an igniter port or opening 30 in which an ignition system or assembly (not shown) is inserted for ignition of the solid propellant charge 14 when the rocket motor 10 is prepared for operation. A bearing 32 is provided within the opening 30 for a purpose to be described hereinafter. Bearing 32 includes a bushing 34 and is retained within the opening 30 by a readily removable retaining ring 36.

Figure 4:
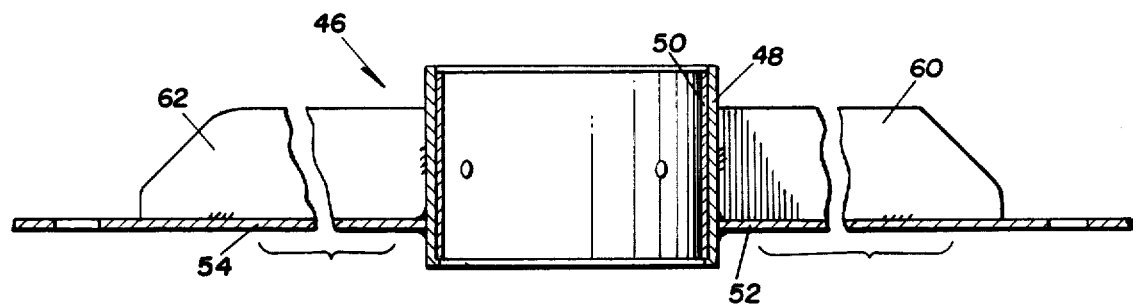
FIG. 4 is a fragmented cross sectional view of the aft motor bearing structure taken along the lines 4—4 of FIG. 3.

The other or aft end of the rocket motor 10, designated 38, is provided with an aft skirt 40, an aft dome 42 and an aft attachment flange 44 for the attachment of a nozzle (not shown) or a preceding stage of a multi-stage rocket motor assembly (also not shown) when the rocket motor 10 is prepared for operation. Mounted on the aft attachment flange 44, as seen in FIG. 1, is an aft motor bearing, indicated at 46, comprising a housing 48 and a bushing 50. Bearing 46 is attached to the flange 44 by elongated legs 52 and 54. Legs 52 and 54 are positioned transversely with respect to the bearing 46, extending away therefrom in opposite directions with one end of leg 52 being welded by a weld 53 to the lower side of bearing 46, and one end of leg 54 being welded by a weld 55 to the upper side thereof, as shown in FIGS. 1 and 4. The other ends of legs 52 and 54 are attached by bolt means 56 and 58, respectively, to the flange 44, as shown in FIG. 1.

Figure 3:
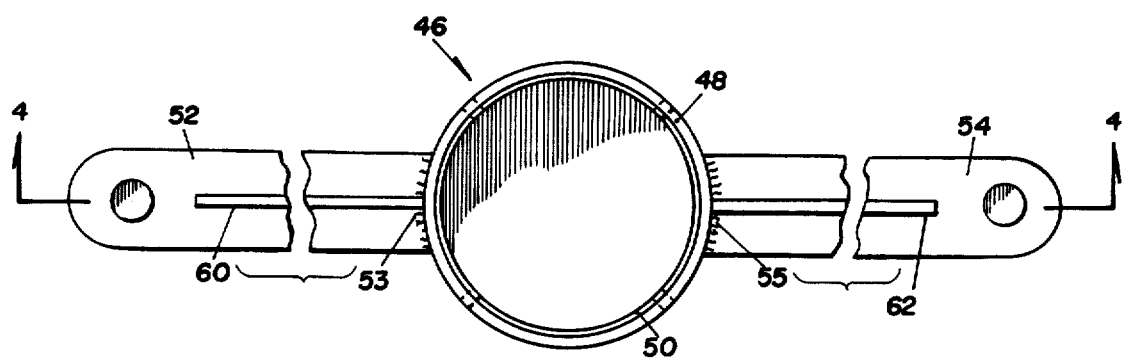
FIG. 3 is a fragmented plan view of a motor bearing and support structure therefor that is provided at the aft end of the rocket motor for supporting the inspecting device.

For stiffening the legs 52 and 54, leg braces may be provided. Thus, leg braces 60 and 62 may be provided for stiffening the legs 52 and 54, respectively. Braces 60 and 62 may be welded to its respectively associated leg 52 and 54 and also to the bearing housing 48, as shown in FIGS. 3 and 4.

The aft motor bearing 46 and the described structural support therefor comprises an adapter, indicated at 63, for supporting a first part 65 of a two-part bore or cavity inspecting device 64 which also includes a second part 67. Perspective views of parts 65 and 67 are shown in FIGS. 7 and 8, respectively.

Figure 5:
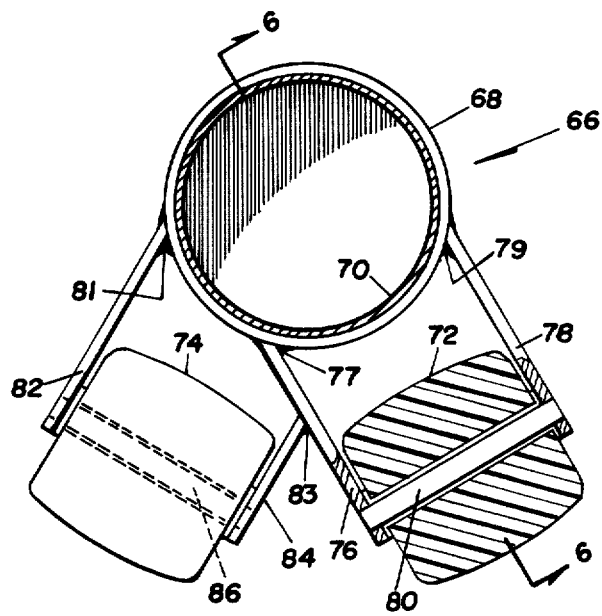
FIG. 5 is a partial cross sectional plan view of a roller yoke that is provided for supporting the inspecting device interiorly of the rocket motor.
Figure 6:
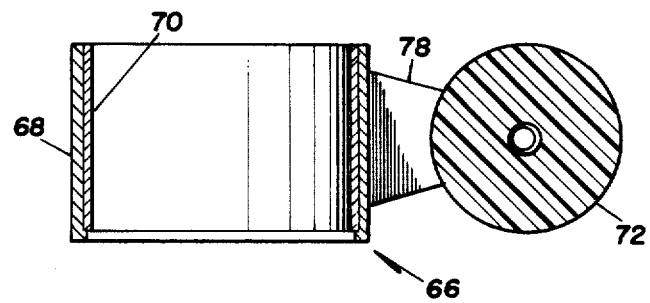
FIG. 6 is a cross sectional view of the roller yoke taken along the lines 6—6 of FIG. 5.

In operation, the inspecting device 64 is bodily introduced into the cavity 16 of the solid propellant charge 16 from the aft end 38 of the rocket motor 10, with a portion of the second part 67 extending aftwardly outside of the motor. The first part 65 of the inspecting device 67 is supported internally of the rocket motor 10 by support means comprising a roller yoke 66 that may best be seen in FIGS. 5 and 6. The roller yoke 66, as shown, comprises a bearing housing 68 having a bushing 70 and rollers 72 and 74. Roller yoke 66 further comprises a first pair of spaced support plates 76 and 78 that are each welded at one end, as shown in FIG. 5, by welds 77 and 79, respectively, to the bearing housing 68 for supporting the roller 72 for rotation on a shaft 80. Additionally, roller yoke 66 further includes a pair of spaced support plates 82 and 84 that are angularly positioned with respect to support plates 76 and 78 for supporting roller 74 on a shaft 86. Support plate 82 is welded by a weld 81 at one end to the bearing housing 68. Support plate 84 is welded at one end by a weld 83 to an intermediate position on support plate 76.

The first part 65 of cavity inspecting device 64, as shown in FIG. 1, 7 and 8, includes a first tubular portion 88. Tubular portion 88, as best seen in FIG. 7, extends through the bearing housing 68 of roller yoke 66, being arranged to be snugly received therein for support while allowing rotation in either direction through 360°. Rollers 72 and 74 of roller yoke 68, as shown in FIG. 2, rest on adjacent star points 18 of the cavity 16 of propellant charge 14. It will be understood, however, that, if desired, the rollers 72 and 74 may be arranged and configured, as necessary, to ride on a single star point 18, in a single star valley 20, in adjacent star valleys 20, or on a cylindrical surface.

Tubular portion 88 is adapted, at the end 90 facing the aft end 38 of the rocket motor 10, to be coupled by a detent connecting means 94 to a second tubular portion 92 the internal and external diameters of which are substantially the same as the internal and external diameters of tubular portion 88. The second tubular portion 92 is included in the second part 67 of inspecting device 64.

The detent connecting means 94, as shown in FIGS. 1 and 8, comprises a relatively short tubular section 96 that has an external diameter such that it fits snugly into the forward end of the tubular portion 92 and also into the aft end 90 of the tubular portion 88. Tubular section 96 is normally retained in the forward end of tubular portion 92 by detent spring and pin means comprising first and second flat spring members 98 and 100, respectively. Each of members 98 and 100 is anchored at one end internally of tubular section 96 and has attached, at the other end, a respectively associated pin or button 102 and 104 that extends through a respectively associated hole 106 and 108 in the tubular section 96, protruding therefrom. When the tubular portions 88 and 92 are brought together into coupling relationship, the tubular section 96 is inserted into the end 90 of tubular portion 88. The protruding buttons 102 and 104 are depressed, allowing the tubular section 96 to be moved into the tubular portion 88 until the end 90 thereof abuts the end 110 of the tubular portion 92. Relative rotation of tubular portions 88 and 92 then brings the buttons 102 and 104 into alignment with holes 112 and 114 provided adjacent the end 90 of the tubular portion 88. The buttons 102 and 104 extend into a respectively associated hole 112 and 114 under the bias of its respectively associated spring member 98 and 100 and thus couple the tubular portions 88 and hold them together. Tubular portions 88 and 92 may be readily uncoupled merely by depressing the buttons 102 and 104 and pulling tubular portions 88 and 92 apart.

As shown in FIGS. 1, 7, 9 and 10, the first tubular portion 88 of the cavity inspection device 64 includes an enclosure 116 having circular end walls 118 and 120 that houses a light source means 122 for illuminating the interior of the motor. The enclosure 116 is made explosion proof by means well known to the art and is self-contained. Thus, the enclosure 116 further includes an elongated flat reflector or mirror 124 for reflecting light from light source 122, a cradle 126 for housing two batteries 128 and 130, an on-off switch 132 and associated circuitry for selectively energizing the light source 122 from the batteries 128 and 130. The enclosure 116 also includes an elongated window 136 through which light reflected from mirror 124 passes for illuminating the ignition surface 22 of propellant charge 16. As shown, window 136 extends parallel to the longitudinal axis of the first tubular portion 88.

Desirably, the light source 122 may comprise a fluorescent tube, for example, a RAY-O-VAC SPORTSMAN 360 Lantern No. F-6T5/CW. Each of the batteries 128 and 130 may comprise a 6 volt direct current battery having spring terminals. In accordance with the invention, just prior to the introduction of the inspecting device 64 into a rocket motor 10 for inspection of the interior thereof, the on-off switch 132 is activated to its "ON" position for energizing the fluorescent tube 132. As best seen in FIG. 9, window 136 is appropriately sealed as required for explosion proofing by a removable plate 137. Plate 137 is removable to allow replacement of the fluorescent tube 122 and batteries 128 and 130. Removal of plate 137 is not normally required to energize the fluorescent tube 122 when assembling and/or preparing the inspecting device 64 for operation since the switch 132 is accessible for actuation through the forward end 164 of the first tubular portion 88.

As shown in FIGS. 1, 7, 9 and 10, the tubular portion 88 of inspecting device 64 includes, immediately aft of the light enclosure 116, a cutout or aperture 138 that is symmetrically disposed with respect to the light source mirror 124 and fluorescent tube 122, facing in the same direction therewith. Aperture 138 exposes the interior of first tubular portion 88 to light radiation that is reflected from the surface 22 of the propellant cavity 16. Positioned within the aperture 138, tilted at an angle of about 45° to the plane of the light source mirror 124, is an aft reflector or mirror 140. Mirror 140, as shown, is positioned to reflect light received from the cavity surface 22 through the first tubular portion 88 and also the coaxial second tubular portion 92 to visual observation or viewing means, generally indicated at 142, provided at the aft end 198 of tubular portion 92.

The structure for supporting aft mirror 140, as seen in FIGS. 1 and 11-16, comprises a shaft 144 and a thin circular plate or disc 146. Detail views of the shaft 144 are shown in FIGS. 11, 12 and 13; detail views of the circular plate 146 are shown in FIGS. 14 and 15; and an assembly of the shaft 144, circular plate 146 and mirror 140 with the tubular portion 88 is illustrated in FIGS. 1, 10 and 16. In assembling the support structure for mirror 140, the circular plate 146 is attached to shaft 144, in an elongated recess 148 thereof by means of two screws (not shown) that extend through a respectively associated hole 150 and 152 in shaft 144 and are received in a respectively associated tapped hole 154 and 156 in the circular plate 146.

Mirror 140 has a diameter that is approximately the same as that of circular plate 146 and may be attached to the latter in any suitable manner as, for example, by the use of a suitable adhesive (not shown). The depth of recess 148 is such that when assembled the reflecting plane of mirror 140 coincides with the pivotal axis of shaft 144.

Forward of the light enclosure 116, as best seen in FIGS. 1 and 10, there is provided a second flat circular forward reflector or mirror 158. Mirror 158 is pivotally mounted on a first end 160 of a mirror bolt 162 that is illustrated in FIGS. 17 and 18 and extends forwardly of the first tubular portion 88, from the forward end 164 thereof. The second end 166 of bolt 162 is adapted to be screwed into a helicoil tapped hole 168 in the hub 170 of a mirror support disc 172. Support disc 172, a detail of which is shown in FIGS. 19 and 20, fits snugly within and is held in the forward end 164 of the first tubular portion 88 by a retaining ring 174, as shown in FIG. 10.

Retaining ring 174 fits over the end 164 of tubular portion 88 and is removably held in place by three thumb screws 176 that are spaced around the periphery of ring 174. Two only of the thumb screws 176 are visible in the perspective view of FIG. 9, but the location of all three is apparent from the plan view of the mirror support disc 172, as shown in FIG. 19.

Each thumb screw 176 desirably is retained in the rim of the retaining ring 174 by means of a helical coil insert 178, as seen in FIGS. 10 and 22. When fully screwed in its respectively associated helical coil insert, each thumb screw is adapted to enter a respectively associated hole 180 in the end 164 of tubular portion 88, one such hole 180 being indicated in FIG. 10, thereby firmly to retain mirror support disc 172 to the end 164 of tubular portion 88.

In accordance with the invention, the three holes 180 in the tubular portion 164 are so positioned that the transverse angle with respect to the longitudinal axis of the tubular portion 88 at which forward mirror 158 is held by bolt 162 is substantially the same as that at which the aft mirror 140 is held by shaft 144.

At the time of and just prior to assembling the forward mirror 158 to the forward end 164 of the first tubular portion 88 in readying the inspecting device 64 for operation, the switch 132 is actuated to energize the fluorescent tube 122 by reaching into the end 164 of tubular portion 88. Similarly, following the completion of an inspection run and upon disassembly of the forward mirror 158 from the end of the tubular portion 88, the switch 132 is actuated to deenergize tube 122.

Figure 23:
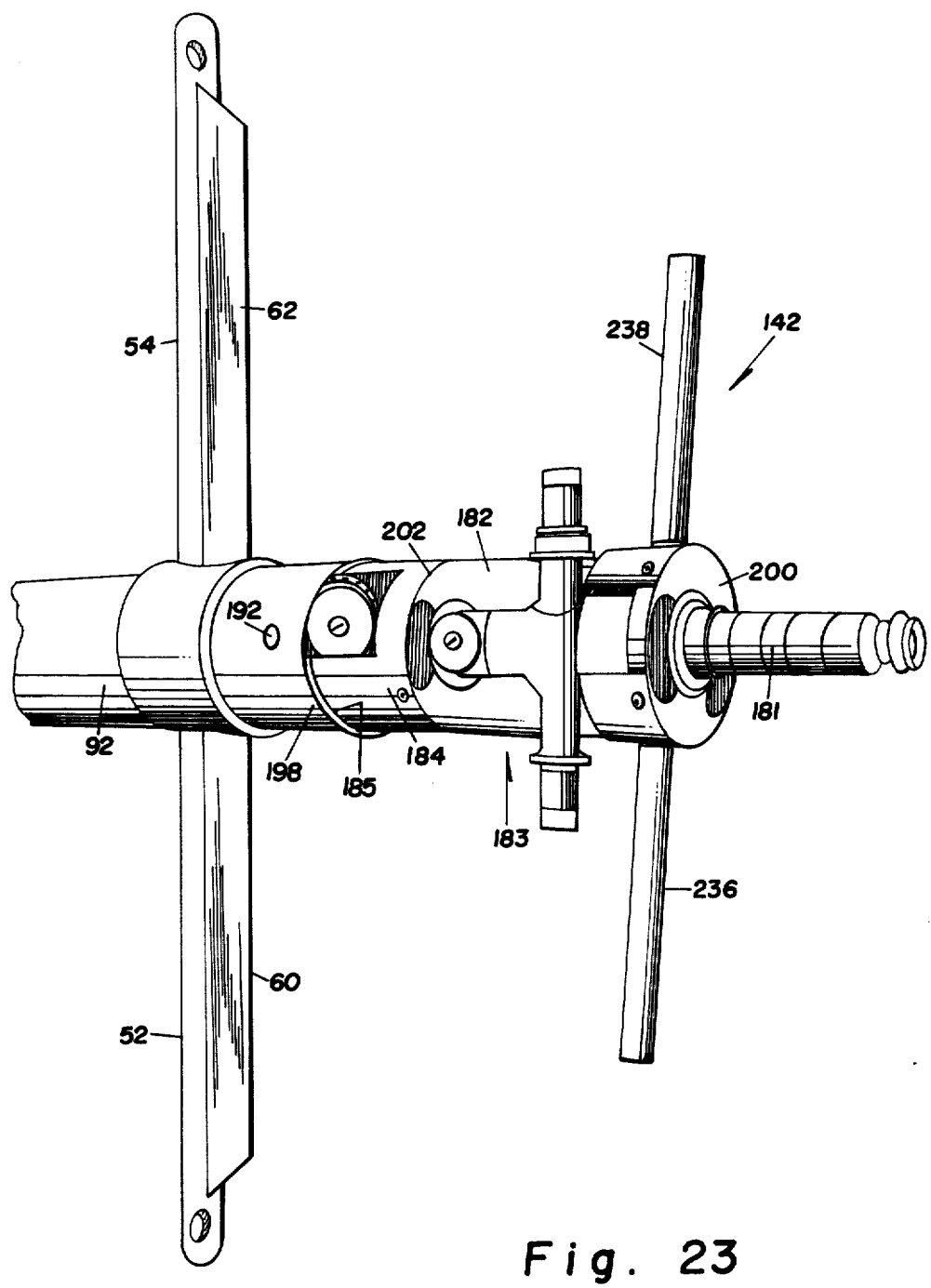
FIG. 23 is an enlarged fragmented perspective view of part of the second portion of the inspecting device showing the construction of the mounting means therefor and also a Jig Transit for viewing the interior surface of the propellant.

The visual observation or viewing means 142, as best seen in FIG. 23, comprises a conventional jig transit 182 having a telescope 181. Transit 182 is mounted in the aft end of tubular portion 92 by a transit mount 183 comprising a transit tube 184 and ring transit mounts 200 and 202. Transit mount 183, as shown in FIGS. 1 and 30, is slidingly received in the end 198 of tubular portion 92, a ring portion 185 on transit mount 183 abutting against the end 198 of tubular portion 92.

Figure 24:
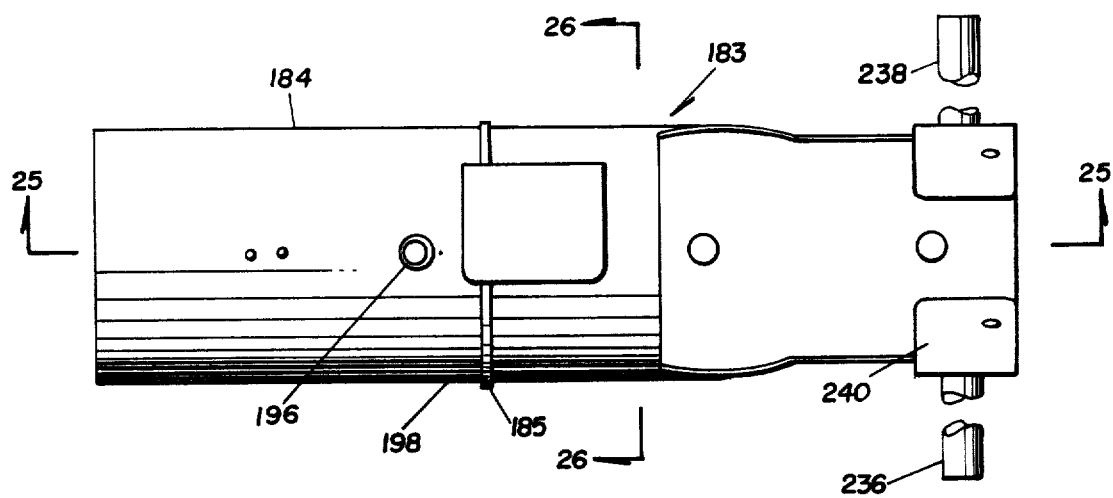
FIG. 24 is a top plan view of a transit tube for the Jig Transit of FIG. 23.
Figure 25:
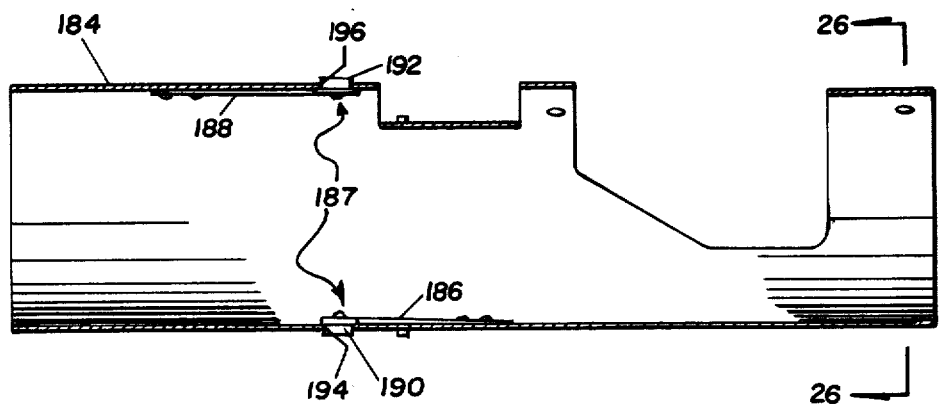
FIG. 25 is a cross section of the transit tube taken along the lines 25—25 of FIG. 24.
Figure 26:
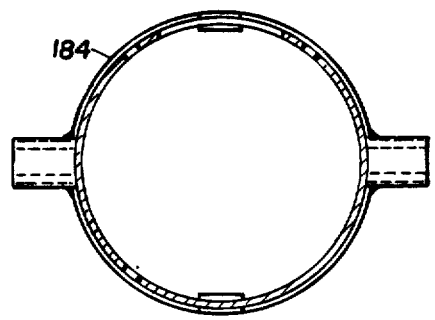
FIG. 26 is a cross section of the transit tube taken along the lines 26—26 of FIG. 24.

The detailed construction of the transit tube 184 is shown in FIGS. 24, 25 and 26. Included within transit tube 184, as best seen in FIG. 25, are detent spring and pin means 187 comprising oppositely positioned first and second flat spring members 186 and 188, respectively, one end of each of the latter being anchored internally of transit tube. Attached to the other end of each of spring members 186 and 188 is a respectively associated pin or button 190 and 192 that extends through a respectively associated hole 194 and 196 in the transit tube 184. Upon insertion of the transit tube 184 into the aft end 198 of the second tubular portion 92, buttons 190 and 192 each enter a respectively associated hole 199 and 201 in the aft end 198 of tubular portion 92 to removably lock the latter and transit tube 184 together.

Figure 29:
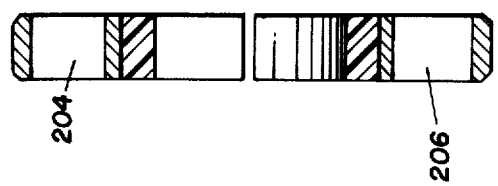
FIG. 29 is a cross section of the ring-transit mount taken along the lines 29—29 of FIG. 28.
Figure 27:
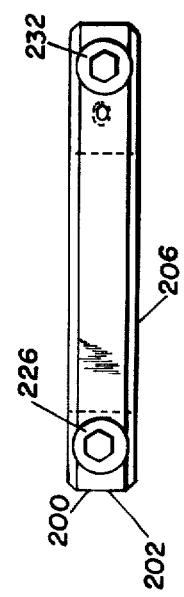
FIG. 27 is a top plan view of a ring-transit mount for the Jig Transit of FIG. 23.
Figure 28:
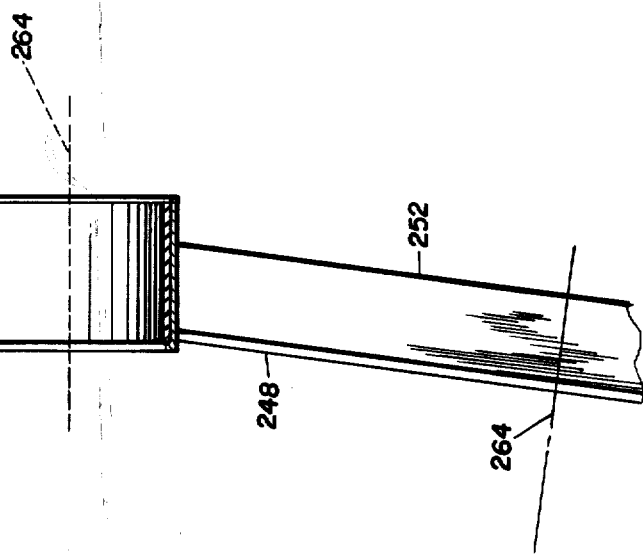
FIG. 28 is a side view, in partial section, of the ring-transit mount of FIG. 27.
Figure 30:
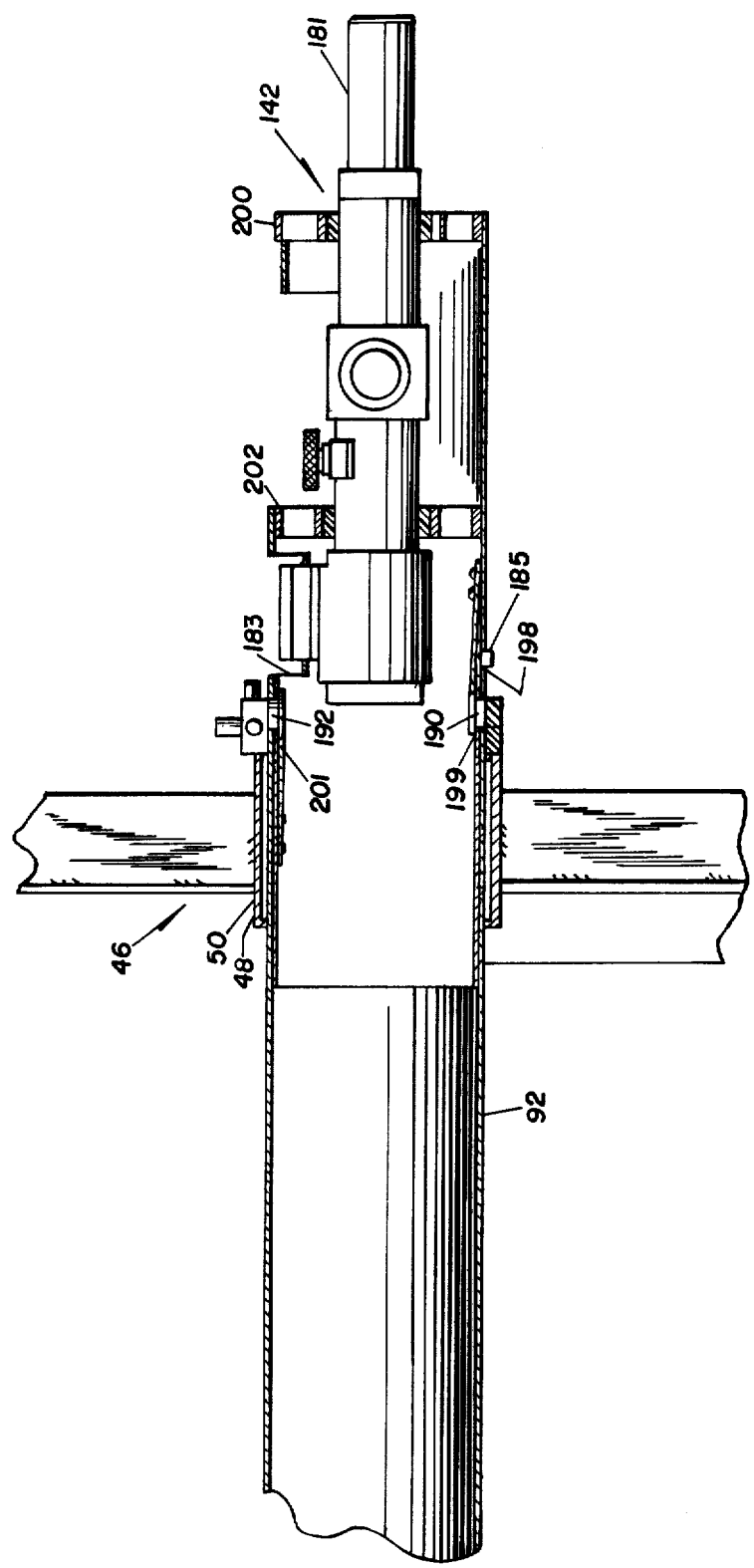
FIG. 30 is a schematic view, partly in cross section and on a scale enlarged from that shown in FIG. 1, illustrating the mounting of the Jig Transit in the aft end of the inspecting device.

As shown in FIGS. 23 and 30, the jig transit 182 is removably retained in the transit tube 184 by two ring transit mounts 200 and 202 which may be identical and are adapted to be clamped over spaced portions of jig transit 182 for enabling the latter to be mounted in the end of the transit tube 184, as shown in FIGS. 1 and 30. The detailed construction of the ring transit mounts 200 and 202 is shown in FIGS. 27, 28, and 29. As there shown, each ring transit mount 200 and 202 comprises two separable semi-circular parts, respectively designated 204 and 206. Part 204 is bored at 208 and 210 along a respective axis 218 and 222 that is substantially perpendicular to the axis of the ring mounts 200 and 202, the bores 208 and 210 being counter-bored at 214 and 216 respectively. A tap 216 in semi-circular part 206 is disposed about the axis 218. Similarly, a tap 220 in part 206 is disposed about the axis 222. The counter bore 208 is provided in semi-circular part 204 to provide a step bearing 224 for the head 226 of a cap screw 228 that is threadedly secured to the tap 216 in semi-circular part 206. Similarly, the counter bore 210 is provided in part 204 to provide a step bearing 230 for the head 232 of a cap screw 234 threadedly secured to tap 220 in part 206.

The inspecting device 64, when disassembled for transport, comprises six main parts, specifically a bearing 32 at the head end of a rocket motor 10, tubular parts 65 and 67, an adapter 63 for installation of the inspecting device 64 at the aft end of the motor 10, a jig transit mount 183 including transit tube 184 and ring transit mounts 200 and 202, and a jig transit 182. In accordance with the invention, the bearing 32 at the head end of the motor 10 is the same size as the bearing 46 at the aft end of the motor 10. Thus, the bearing 32 as well as the bearing 46 is adapted to accommodate the transit mount 183 for enabling the jig transit 182 to be used at the head end of the motor 10 for observing from the latter end also the solid propellant surface 22.

In the operation of the inspecting device 64 from the aft end 38 of motor 10, as illustrated in FIG. 1, the tubular section 96 of the second part 67 is inserted into the end 90 of the first part 65. Upon abutment of the respective ends 90 and 110 thereof, the parts 65 and 67 are relatively rotated slightly or as necessary to allow the detent connecting means 94 to lock the parts together. This coupling operation may, if desired, be effected with the first part 65 inserted into the aft end of motor 10 with the rollers 72 and 74 of the roller yoke 65 resting on adjacent star points of the solid propellant charge 14.

With the parts 65 and 67 so coupled and inserted in the aft end of motor 10, the bearing 46 of the adapter 63 is slipped over the end 198 of part 67 and the elongated legs 52 and 54 are bolted by the bolt means 56 and 58 to the aft attachment flange 44 of the motor 10.

The jig transit mount 183 may then be inserted into the end 198 of part 67. Mount 183 is moved into part 67 until ring portion 185 abuts against the end 198 of part 67 and the detent connecting means 187 are in position to lock the transit mount 183 within the end 198 of part 67.

An operator may inspect the interior surface 22 of the solid propellant charge through the telescope 181. Light from the fluorescent tube 122 is directly directed and also by reflection from mirror 124 through the sealed window 136 onto the surface 22 of the solid propellant charge 14. This makes a portion of the surface 22 of propellant charge 14, adjacent to or aft of the light source 122, visible for inspection to the observer by way of light reflected by aft mirror 140 along the axes of the tubular portions 88 and 92 to the telescope 181.

In accordance with the invention, the locked parts 65 and 67 of the inspecting device 64 may be rotated in bearing 46 through 360° thereby to enable the observer to obtain a view completely around the ignition surface 22. For convenience in effecting such rotation, there may be provided oppositely disposed handles 236 and 238 that are attached by a clamp 240 to the transit tube 184, as best seen in FIG. 24, clamp being attached by suitable screws to the transit tube 184. It is noted that such handles may be dispensed with, if desired, since the tubular portion 92 is readily rotatable in bearing 46 and may be rotated merely by grasping the tubular portion 92 by hand.

Additionally, the inspecting device is capable of being moved longitudinally of the cavity 16 of the solid propellant by sliding the second tubular enclosure 88 lengthwise in the bearing 46 thereby enabling the operator, when looking at light reflected by mirror 140 through the telescope 181, to observe the condition of the surface 22, aft of the light source 122, along the length thereof. As those skilled in the art will understand, an additional tubular portion or portions (not shown) may be added to extend the length of the inspecting device 64 where necessary to traverse the bore of a rocket motor having a greater length.

Further, in accordance with the invention, the inspecting device 64 is capable of allowing inspection of the surface 22 of the propellant charge 14 forward of the light source 122, as well as aft thereof. Thus, when it is desired to inspect the surface 22 forward of the light source 122, the jig transit mount 183 and jig transit 182 may be removed from the end 198 of the tubular portion 92 and inserted in the bearing 32 at the head end of the motor 10. When so positioned, a portion of the surface 22 of propellant charge 14 forward of the light source 122 is made visible to the observer by way of light reflected from the forward mirror 158 through the telescope 181. For inspection through 360° around the surface 22 of cavity 16, an assistant working in conjunction with the operator may rotate the inspecting device locked parts 65 and 67 by grasping by hand the end 198 of the tubular portion 198.

While in FIG. 1, the cavity inspecting device 64 is shown mounted in the aft end of the rocket motor 10, it will be understood that, if desired, the cavity inspecting device may be mounted on and supported by the exit portion of the rocket motor nozzle, thereby facilitating cavity inspection after a period of storage of fully assembled rocket motors. Thus, as illustrated in the fragmented view of FIG. 31, there is provided a nozzle bearing 242 that is mounted on the exit portion 244 of a nozzle 246 for rocket motor 10 by means of legs 248 and 250. Legs 248 and 250 are provided with respectively associated stiffening braces 252 and 254. The ends of each of legs 248 and 250 remote from the bearing 242 are adapted to be clamped to the exit portion 244 of nozzle 246 by suitable clamping means, the clamping means 256 for leg 250 only being shown in FIG. 31 to minimize complication of the drawing. Clamping means 256 as shown, includes clamping members 258 and 260 and a screw 262 which cooperate to hold the end of leg 250 into firm engagement with the aft end of the exit rim or portion 244 of nozzle 246.

Figure 31:
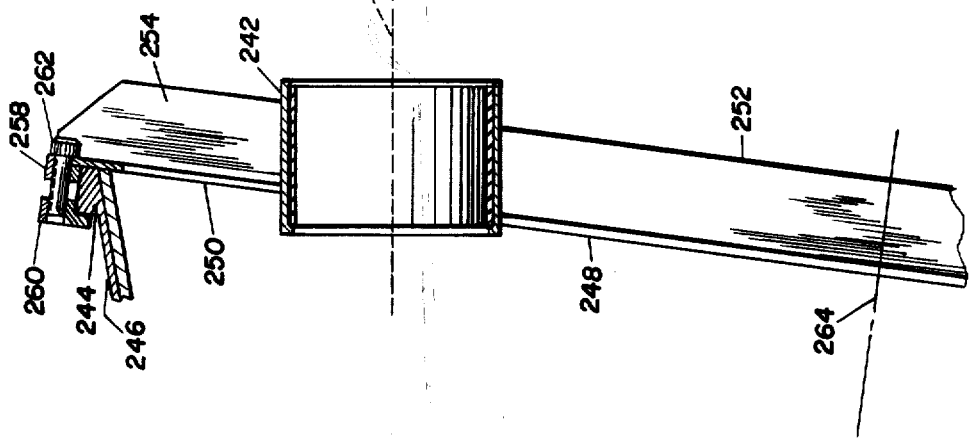
FIG. 31 is a fragmented view of a nozzle bearing and support structure therefor that may be provided at the exit portion of the nozzle of the rocket motor for supporting the inspecting device.

The nozzle bearing 242 and support structure therefore as illustrated in FIG. 31 is that for a canted nozzle in which the central axis 264 is disposed at an angle with respect to the longitudinal axis of the rocket motor 10, the latter axis coinciding with the axis of the nozzle bearing 242, and hence, with the longitudinal axis of the inspecting device 64.

Thus, in accordance with the invention, there has been provided a detachable cavity inspecting device 64 that is operable to provide a ready inspection of the entire cavity from the outside thereof. The inspecting device 64 enables the condition of the entire interior surface of the cavity of a cast solid propellant of a rocket motor to be visually observed and inspected from outside the motor, from either end thereof. The cavity inspecting device 64 is further characterized in being portable, self-contained, light-weight, compact, explosion proof, and is capable of being dismantled and readily transported by automobile or commercial aircraft by an operator assigned to make rocket motor solid propellant cavity inspections.

What is claimed is:

1. A detachable cavity inspecting device for a solid propellant rocket motor having a casing disposed symmetrically with respect to a longitudinal axis, a head end with an igniter opening therein, and an aft end with an opening to which a nozzle may be attached, said detachable cavity inspecting device being introducible through an opening into a cavity to be inspected in the rocket motor and comprising
   a tubular housing having an aft end, a forward end, and means adjacent said forward end defining an aperture in the tubular housing wall for introducing light rays to the interior of the tubular housing,
   adapter means at the aft end of said tubular housing for mounting said tubular housing in an opening of the rocket motor with the forward end of said tubular housing extending therefrom into the cavity,
   support means for said tubular housing at an intermediate position along the length thereof and adapted to rest under the force of gravity on the surface of solid propellant surrounding the cavity,
   light source means within said tubular housing at a position forward of said aperture in said tubular housing for illuminating a portion of the surface of the cavity,
   aft reflector means positioned in said aperture in said tubular housing to reflect light from an illuminated portion of the surface of the cavity through the interior of said tubular housing in a direction toward the aft end thereof,
   viewing means attached to the aft end of said tubular housing for observing from external of the rocket motor the illuminated portion of the surface of the cavity as reflected through said tubular housing by said aft reflector means, and
   bearing means individually associated with said adapter means and said support means for allowing said tubular housing to be rotated with respect thereto to enable unobstructed illumination and observation of the surface of the cavity through an angle of 360° around the longitudinal axis of the rocket motor without repositioning of the viewing means.

2. A detachable cavity inspecting device as defined by claim 1 further including a forward reflecting means positioned on said tubular housing forward of said light source means, and said aft end of
   wherein said viewing means is detachable from said tubular housing at the opening in one end of the rocket motor and is adapted to be used at the opening in the other end of the rocket motor for observing the illuminated portion of the surface of the cavity as reflected from said forward reflecting means.

3. A detachable cavity inspecting device as defined in claim 1
   wherein said adapter means and said support means each include individually associated bearing means therein that allow the tubular housing to be rotated with respect thereto thereby to enable illumination and observation of the surface of the cavity through an angle of 360° around the longitudinal axis of said rocket motor.

4. A detachable cavity inspecting device as defined by claim 1 wherein the bearing means associated with said adapter means allows axial sliding movement of said tubular housing with respect thereto.

5. A detachable cavity inspecting device as defined in claim 4 wherein said support means includes roller means attached to the bearing means associated therewith for engaging the surface of the cavity thereby to allow said light source and said aft reflecting means to traverse the cavity surface parallel to the longitudinal axis of the rocket motor.

6. A detachable cavity inspecting device as defined in claim 5 wherein said tubular housing is comprised of first and second tubular portions and includes detent connecting means for separably connecting said first and second tubular portions with said first tubular portion having attached thereto said light source means, said aft reflecting means and said support means, and said second tubular portion having said viewing means attached thereto.

7. A detachable cavity inspecting device as defined in claim 6 wherein said viewing means comprises a jig transit and further includes a transit mount and detent connecting means for separably mounting said jig transit in the aft end of said second tubular portion.

8. A detachable cavity inspecting device as defined by claim 7 further including a forward reflecting means positioned on said first tubular portion forward of said light source means, and
   wherein said viewing means including said transit mount and detent connecting means are adapted to be detached from said aft end of said tubular housing at the opening in one end of the rocket motor and used at the opening in the other end of the rocket motor for observing the illuminated portion of the surface of the cavity as reflected from said forward reflecting means.

9. A detachable cavity inspecting device as defined in claim 8 further including bearing means that are insertable in the opening at said other end of the rocket motor for receiving the transit mount and detent connecting means for facilitating the mounting of the jig transit in said opening at said other end of the rocket motor.

10. A detachable cavity inspecting device as specified in claim 9 wherein said light source is contained within an explosion-proof enclosure.

11. A detachable cavity inspecting device as defined in claim 1 wherein said support means is adapted to rest under the force of gravity on the surface of solid propellant surrounding the cavity.

12. A detachable cavity inspecting device as defined in claim 1 wherein said tubular housing comprises at least two tubular portions and detent connecting means for connecting said tubular portions in end to end relation.

13. A detachable cavity inspecting device as defined in claim 1 further comprises explosion proof enclosure means for said light source means.

14. A detachable cavity inspecting device as defined in claim 13 wherein said tubular housing comprises at least two tubular portions and detent connecting means for connecting said tubular portions in end to end relation.

15. A detachable cavity inspecting device for a solid propellant rocket motor having a casing and an opening in at least one end thereof, said detachable cavity inspecting device is introducible through into a cavity to be inspected in the rocket motor and comprises
- a tubular housing having an aft end, a forward end, and means adjacent said forward end defining an aperture in the tubular housing wall for introducing light rays to the interior of the tubular housing,
- adapter means at the aft end of said tubular housing for mounting said tubular housing in the opening of the rocket motor with the forward end of said tubular housing extending into the cavity,
- light source means within said tubular housing at a position forward of said aperture in said tubular housing for illuminating a portion of the surface of the cavity,
- explosion proof enclosure means for said light source means,
- aft reflector means positioned in said aperture in said tubular housing to reflect light from an illuminated portion of the surface of the cavity through the interior of said tubular housing in a direction toward the aft end thereof,
- viewing means attached to the aft end of the tubular housing for observing from externally of the rocket motor the illuminated portion of the surface of the cavity as reflected through said tubular housing by said aft reflector means, and
- bearing means for allowing said tubular housing to be rotated with respect to said adapter means to enable unobstructed illumination and observation of the surface of the cavity through an angle of 360° around the longitudinal axis of the rocket motor without repositioning of the viewing means and for allowing sliding movement of said tubular housing in an axial direction with respect to said adapter means.

16. A detachable cavity inspecting device as defined in claim 15 wherein said tubular housing comprises at least two tubular portions and detent connecting means for connecting said tubular portions in end to end relation.

17. A detachable cavity inspecting device as defined in claim 15 further comprises support means for said tubular housing at an intermediate position along the length thereof and bearing means associated with said support means for allowing said tubular housing to be rotated with respect to said support means to enable unobstructed illumination and observation of the surface of the cavity through an angle of 360° around the longitudinal axis of the rocket motor without repositioning of the viewing means.

18. A detachable cavity inspecting device for a solid propellant rocket motor having a casing and an opening in at least one end thereof, said detachable cavity inspecting device is introducible through the opening into a cavity to be inspected in the rocket motor and comprises
- a tubular housing which includes at least two tubular housing portions connectable end to end and which has an aft end, a forward end, and means adjacent said forward end defining an aperture in the tubular housing wall for introducing light rays to the interior of the tubular housing,
- adapter means at the aft end of said tubular housing for mounting said tubular housing in the opening of the rocket motor with the other end of said tubular housing extending into the cavity,
- light source means at a position forward of said aperture in said tubular housing for illuminating a portion of the surface of the cavity,
- aft reflector means positioned in said aperture in said tubular housing to reflect light from an illuminated portion of the surface of the cavity through the interior of said tubular housing in a direction toward the aft end thereof,
- viewing means attached to the aft end of said tubular housing for observing from externally of the rocket motor the illuminated portion of the surface of the cavity as reflected through said tubular housing by said aft reflector, and
- detent connecting means for separably connecting said tubular housing portions.

19. A detachable cavity inspecting device as defined in claim 18 further comprises support means for said tubular housing at an intermediate position along the length thereof.

* * * * *